(12) United States Patent
Torii

(10) Patent No.: US 8,568,036 B2
(45) Date of Patent: Oct. 29, 2013

(54) WHEEL BEARING APPARATUS FOR A VEHICLE

(75) Inventor: Akira Torii, Iwata (JP)

(73) Assignee: NTN Corporation, Osak-shi (JP)

( * ) Notice: Subject to any disclaimer, the term of this patent is extended or adjusted under 35 U.S.C. 154(b) by 0 days.

(21) Appl. No.: 12/774,029

(22) Filed: May 5, 2010

(65) Prior Publication Data

US 2010/0215304 A1    Aug. 26, 2010

Related U.S. Application Data

(63) Continuation of application No. PCT/JP2008/003201, filed on Nov. 5, 2008.

(30) Foreign Application Priority Data

Nov. 6, 2007    (JP) ................................. 2007-288912

(51) Int. Cl.
    *F16C 13/00*    (2006.01)

(52) U.S. Cl.
    USPC ........................................................ 384/544

(58) Field of Classification Search
    USPC .................. 384/544, 548, 589; 301/105.1
    See application file for complete search history.

(56) References Cited

U.S. PATENT DOCUMENTS

| | | | |
|---|---|---|---|
| 3,102,758 A * | 9/1963 | Holmes, Jr. ................. | 301/35.63 |
| 6,866,345 B2 * | 3/2005 | Fakhoury et al. .......... | 301/105.1 |
| 7,614,796 B2 * | 11/2009 | Hattori et al. ................. | 384/544 |
| 2001/0016092 A1 * | 8/2001 | Komaba et al. ............... | 384/589 |
| 2003/0048967 A1 * | 3/2003 | Sahashi et al. ................ | 384/544 |
| 2005/0018939 A1 * | 1/2005 | Niwa et al. .................... | 384/544 |
| 2009/0154857 A1 * | 6/2009 | Komori ......................... | 384/512 |
| 2009/0154859 A1 * | 6/2009 | Takada et al. ................. | 384/544 |

FOREIGN PATENT DOCUMENTS

| | | |
|---|---|---|
| CN | 2570527 Y | 9/2003 |
| JP | 2003-094905 | 4/2003 |
| JP | 2004-052787 | 2/2004 |
| JP | 2005-119505 | 5/2005 |
| JP | 2005-289319 | 10/2005 |
| JP | 2005-297925 | 10/2005 |
| WO | WO 2007052805 A1 * | 5/2007 |

* cited by examiner

*Primary Examiner* — Thomas R Hannon
*Assistant Examiner* — Adam D Rogers
(74) *Attorney, Agent, or Firm* — Harness, Dickey & Pierce, P.L.C.

(57) ABSTRACT

A vehicle wheel bearing apparatus has an outer member, an inner member and double row rolling elements freely rollably contained between the outer raceway surfaces and inner raceway surfaces, respectively, of the outer member and the inner member. Either one of the outer member or inner member, on its outer side end, is integrally formed with a wheel mounting flange to mount a wheel. A plurality of bolt apertures is formed in the wheel mounting flange. The wheel is secured on the wheel mounting flange by a plurality of bolts. Cut-out portions are formed between the bolt apertures. The cut-out portions avoid the vicinity of each bolt aperture. Each cut-out portion is formed with a circular arc configuration so that its deepest portion is positioned closely to a pitch circle diameter of the bolt apertures.

6 Claims, 16 Drawing Sheets

US 8,568,036 B2

WHEEL BEARING APPARATUS FOR A VEHICLE

CROSS-REFERENCE TO RELATED APPLICATION

This application is a continuation of International Application No. PCT/JP2008/003201, filed Nov. 5, 2008, which claims priority to Japanese Application No. 2007-288912, filed Nov. 6, 2007. The disclosures of the above applications are incorporated herein by reference.

FIELD

The present disclosure relates to a vehicle wheel bearing apparatus, such as an automobile, that rotationally supports a wheel of the vehicle and, more particularly, to a wheel bearing apparatus that can reduce size and weight and improve the accuracy of the surface run-out of a wheel mounting flange to limit the generation of brake judder.

BACKGROUND

In recent years, braking force has been increased due to the spread of the disc brake. Due to this, sometimes uncomfortable low noise is caused, especially during traveling, due to vibration of the brake rotor sandwiched by the brake pads. Such a phenomenon, called "brake judder", has been noticed in accompanying with tendency of development of vehicles having high performance and lesser noise. Thus, it is a new technical object to analyze and improve the brake judder problem.

Although the mechanism of brake judder has not been clearly solved, it is believed that the accuracy of the surface run-out of the brake rotor contacting with the brake pads is one cause of brake judder. The accuracy of the surface run-out of the brake rotor is influenced not only by the run-out accuracy of the brake rotor itself, but by the accuracy of the surface run-out of the wheel mounting flange, the axial run-out of the rolling bearings, the accuracy of the raceway surfaces, and the assembling accuracy of the rolling bearings, etc.

It is desirable for the vehicle wheel bearing apparatus, on one hand, to reduce its size and weight to reduce its manufacturing cost and fuel consumption in view of the material savings. On the other hand, it is desirable to increase the wheel bearing apparatus rigidity to improve steering stability. The desire to reduce the vehicle weight has increased especially in the field of light weight vehicles, such as light weight 4-wheel vehicles, or small size vehicles. The desire to reduce the vehicle weight has increased.

FIG. 13 shows one example of a vehicle wheel bearing apparatus of the prior art intended the weight reduction. This wheel bearing apparatus 50 is a representative structure used for a driving wheel side. The apparatus is formed as a unit including a wheel hub 51 and a double row rolling bearing outer member 52.

The wheel hub 51 is made by forging and has a hollow structure. The wheel hub 51 is integrally formed with a wheel mounting flange 53 on which a wheel (not shown) is mounted. One inner raceway surface 51a is arranged opposite to one 57a of the double row outer raceway surfaces 57a, 57a of the outer member body 57. A cylindrical portion 51b axially extends from the inner raceway surface 51a. The inner circumference of the cylindrical portion 51b is formed with a spline 54 for torque transmission purposes.

An inner ring 55 is press fit onto the cylindrical portion 51b of the wheel hub 51. The inner ring 55 is formed, on its outer circumference, with the other inner raceway surface 55a of the inner raceway surfaces 51a, 55a. An end of the cylindrical portion 51b is plastically deformed radially outward to form a caulking portion 56 to axially secure the inner ring 55 relative to the wheel hub 51.

A double row rolling bearing outer member 52 is integrally formed with a body mounting flange 57b. The flange 57b forms part of a suspension apparatus 58. The inner circumference of the outer member 52 is formed with double row outer raceway surfaces 57a, 57a. The outer raceway surfaces 57a, 57a are arranged opposite to the double row inner raceway surfaces 51a, 55a. As can be appreciated, the double row rolling bearing 52 includes the wheel hub 51, the inner ring 55, and double row balls 59, 59, rollably contained between the inner and outer raceway surfaces 51a, 55a and 57a, 57a.

Hub bolts 53a are secured at four positions equidistantly arranged along the circumference on the wheel mounting flange 53 of the wheel hub 51. A brake rotor 60 and a wheel are secured on the wheel mounting flange by fastening nuts onto the hub bolts 53a. As shown in FIG. 14, the wheel mounting flange 53 of the wheel hub 51 is formed with bolt apertures 61 through which the hub bolts 53a are secured. Cut-out portions 62, each having a circular arc configuration, are formed on the outer circumference of the wheel mounting flange 53 between the bolt apertures 61 by avoiding the vicinity of each bolt aperture 61.

The cut-out portions 62 are formed so that a deepest portion 62a of each cut-out portion 62 is positioned radially inward of a pitch circle diameter A of the bolt apertures 61 and close to a line B connecting the centers of adjacent bolt apertures 61. In addition, the wheel mounting flange 53 is formed so that it has a thin thickness in a radially outward region 63 including the bolt apertures 61. The wheel mounting flange 53 has a normal thickness in a radially inward region 64, including the bolt apertures 61, so as to have sufficient bending rigidity. This prevents reduction of the bending rigidity of the wheel mounting flange 53 while attempting to reduce its weight (see e.g. Patent Document 1 mentioned below).

According to the prior art wheel bearing apparatus 50, both the prevention in the reduction of the bending rigidity of the wheel mounting flange 53 and achievement of a reduction of weight can be obtained by cutting out portions between of the hub bolts 53a. Thus, the wheel mounting flange 53 has a flower petal-like configuration and keeps the thickness of the radially inward region of the wheel mounting flange 53 normal. In addition, a wheel bearing apparatus 70 shown in FIGS. 15 and 16 is known to further reduce its weight. This wheel bearing apparatus 70 is used for various light weight vehicles such as light weight 4-wheel vehicle or small sized cars. The apparatus 70 includes an inner member 73 with a wheel hub 71 and an inner ring 72, an outer member 74, and double row balls 75, 75 rollably contained between the inner and outer members 73, 74.

The wheel hub 71 has an integrally formed wheel mounting flange 76 on one end. The wheel hub 71 is formed on its outer circumference with an inner raceway surface 71a. A cylindrical portion 71b axially extends from the inner raceway surface 71a. An inner ring 72 is press fit onto the cylindrical portion 71b. The inner ring outer circumference includes another inner raceway surface 72a. The inner ring 72 is axially secured by a caulked portion 71c. The caulked portion 71c is formed by plastically deforming the end of the cylindrical portion 71b radially outward.

Bolt apertures 76a are equidistantly formed along the outer circumference of the wheel mounting flange 76. Hub bolts 76b are press fit therein to fasten a brake rotor R and a wheel W.

The outer member 74 is formed with double row outer raceway surfaces 74a, 74a on its inner circumference. The outer raceway surfaces 74a, 74a are arranged oppositely to the double row inner raceway surfaces 71a, 72a. Double row balls 75, 75 are rollably contained between the outer and inner raceway surfaces 74a, 74a and 71a, 72a, via cages 77. Seals 78, 79 are mounted on both ends of the outer member 74. The seals 78, 79 seal annular openings formed between the outer and inner members 74 and 73.

As shown in FIG. 16, the wheel mounting flange 76 of the wheel hub 71 includes a plurality of radially extending partial flanges 80. Each flange 80 has a bolt aperture 76a at its tip end. A plurality of ridge-shaped reinforcing ribs 80a are formed on the inner surface of the wheel mounting flange 76, which is the opposite side of where a wheel is mounted.

The wheel mounting flange 76 is formed by a plurality of radially extending partial flanges 80. Each flange 80 has a bolt aperture 76 at its tip end. A plurality of ridge-shaped reinforcing ribs 80a are formed on the partial flanges 80. Thus, it is possible to reduce the weight of the wheel hub 71 and to improve the durability of the wheel hub 71 due to a reduction of stress caused in the wheel mounting flange as compared with a wheel hub provided with a circumferentially continuous wheel mounting flange (see e.g. Patent Document 2 mentioned below). Patent Document 1: Japanese Laid-open Patent Publication No. 94905/2003. Patent Document 2: Japanese Laid-open Patent Publication No. 119505/2005

As described above, the wheel bearing apparatus 50, 70 are intended to be used in small passenger car including light weight 4-wheel vehicle or small cars. The run-out of the wheel mounting flange 53, 76 is at most 100 μm or less when used in small cars even thought the wheel mounting flanges 53, 76 of the wheel hub 51, 71 are formed with a flower petal-like configuration or partial flanges 80. Accordingly, particular problems are not caused when the wheel hubs 51, 71 are used in small cars. However, requirement for reduction of NHV (noise vibration harshness) of a vehicle has been increased when they are used in middle or larger class passenger cars. Especially when they are used for wheel bearing apparatus for a front wheel, a highly accurate run-out of the wheel mounting flanges 53, 76 of 30 μm or less would sometimes be required.

Accordingly it has been required to have a flange configuration that can suppress the run-out of the wheel mounting flanges 53, 76 and reduce their weight without the influence of heat treatment applied to the wheel hubs 51, 71. In addition, the wheel mounting flanges 53, 76 are liable to bend when a bending moment is applied. Thus, the brake rotors 60, R will also bend. Although it is necessary to suppress the bending of the wheel mounting flange, the amount of bending of the wheel mounting flanges 53, 76 and accordingly the brake rotors 60, R would be larger than that of wheel mounting flanges having normal disc shaped configuration. This is due to the fact that regions between the hub bolts 53a, 76b are cut out and thus there is no material forming the continuous wheel mounting flange.

SUMMARY

It is, therefore, an object of the present disclosure to provide a vehicle bearing apparatus that can suppress the generation of brake judder by improving the surface run-out accuracy of the wheel mounting flange and also reduce the size and weight of the wheel bearing apparatus while keeping strength and rigidity.

A vehicle wheel bearing apparatus comprises an outer member formed with double row outer raceway surfaces on its inner circumference. An inner member is formed with double row inner raceway surfaces on its outer circumference. The inner raceway surfaces are arranged opposite to the double row outer raceway surfaces. Double row rolling elements are freely rollably contained between the outer raceway surfaces and inner raceway surfaces of the outer member and the inner member, respectively. Either one of the outer member or inner member is integrally formed, on its outer side end, with a wheel mounting flange to mount a wheel. A plurality of bolt apertures is equidistantly formed in the wheel mounting flange along its circumference. The wheel is secured on the wheel mounting flange by a plurality of bolts secured in the bolt apertures. Cut-out portions are formed between the bolt apertures. The cut-out portions avoid the vicinity of each bolt aperture. Each cut-out portion is formed as a circular arc configuration so that its deepest portion is positioned closely to a pitch circle diameter of the bolt apertures.

Thus, either one of the outer member or inner member is integrally formed, on its outer side end with a wheel mounting flange to mount a wheel. A plurality of bolt apertures is equidistantly formed in the wheel mounting flange along its circumference. The wheel is secured on the wheel mounting flange by a plurality of bolts secured in the bolts apertures. The cut-out portions are formed between the bolt apertures and avoid the vicinity of each bolt aperture. Each cut-out portion is formed as a circular arc configuration with its deepest portion positioned closely to a pitch circle diameter of the bolt apertures. Accordingly, it is possible to provide a vehicle bearing apparatus that can suppress the generation of brake judder by improving the surface run-out accuracy of the wheel mounting flange while suppressing deformation due to heat treatment. Also, it can reduce the size and weight of the wheel bearing apparatus while keeping its strength and rigidity.

The deepest portion of each cut-out portion is positioned radially outward of the pitch circle diameter of the bolt apertures. Each cut-out portion smoothly continues to the outer circumference of the wheel mounting flange. The center of the radius of curvature of each cut-out portion is positioned on an extension of a line passing through the center of the wheel mounting flange and the center of mutually adjacent bolt apertures, and there is a relationship (R1=0.7-1.5 PCDb) between the radius of curvature R1 of the cut-out portion and the pitch circle diameter PCDb. This makes it possible to improve the weight reducing effect due to the formation of cut-out portions in the wheel mounting flange. Also, this prevents the generation of shrink marks caused by hindrance of plastic flow of the forged material forming the wheel mounting flange and thus to prevent reduction of the manufacturing accuracy.

A plurality of ridge-shaped reinforcing ribs are formed on the inner side surface of the wheel mounting flange. Each reinforcing rib radially extends from an annular base of the wheel mounting flange and has substantially the same width as a portion in which each bolt aperture is formed. This makes it possible to assure the strength and rigidity of the wheel mounting flange and to further improve weight reduction.

The member of the wheel mounting flange is formed by closed hot forging. This makes it possible to effectively perform the forging process at a high accuracy without hindrance of plastic flow of material. Thus, since the cut-out portions are positioned radially outward of the pitch circle diameter of the bolt apertures, material is present between the bolt apertures. Accordingly corners, stepped portions or chamfered portions can be smoothly formed by the closed hot forging. This makes it possible to suppress bur removal to minimum and thus to reduce the number of manufacturing steps and accordingly the manufacturing cost.

The inner member includes the wheel hub with the wheel mounting flange and an axially extending cylindrical portion. At least one inner ring is press fit onto the cylindrical portion of the wheel hub.

The outer member includes the wheel mounting flange and the inner member includes a pair of inner rings.

The inner member has the wheel hub with an integrally formed wheel mounting flange at one end. One of double row inner raceway surfaces is arranged opposite to one of the double row outer raceway surfaces. The cylindrical portion axially extends from the inner raceway surface. A hardened irregular portion is formed on an inner circumference of the wheel hub. The outer joint member of a constant velocity universal joint is fit into the cylindrical portion, of the wheel hub. The constant velocity joint outer circumference has the other inner raceway surface arranged opposite to the other of the double row outer raceway surfaces. A hollow stem portion axially extends from the inner raceway surface. The wheel hub and the outer joint member are integrally connected to each other by radially expanding the fitting portion of the stem portion of the outer joint member. This forces the fitting portion to bite into the hardened irregular portion formed on the inner circumference of the wheel hub.

The vehicle wheel bearing apparatus of the present disclosure has an outer member formed with double row outer raceway surfaces on its inner circumference. The inner member is formed with double row inner raceway surfaces on its outer circumference. The inner raceway surfaces are arranged opposite to the double row outer raceway surfaces. Double row rolling elements are freely rollably contained between the outer raceway surfaces and inner raceway surfaces, respectively, of the outer member and the inner member. Either one of the outer member or inner member is integrally formed, on its outer side end, with a wheel mounting flange to mount a wheel. A plurality of bolt apertures is equidistantly formed in the wheel mounting flange along its circumference. The wheel is secured on the wheel mounting flange by a plurality of bolts secured in the bolts apertures. Cut-out portions are formed between the bolt apertures by avoiding the vicinity of each bolt aperture. Each cut-out portion is formed as a circular arc configuration so that its deepest portion is positioned closely to a pitch circle diameter of the bolt apertures. Thus, it is possible to provide a vehicle bearing apparatus that can suppress the generation of brake judder by improving the surface run-out accuracy of the wheel mounting flange while suppressing deformation due to heat treatment. Also, it can reduce the size and weight of the wheel bearing apparatus while keeping its strength and rigidity.

A vehicle wheel bearing apparatus comprises an outer member integrally formed, on its outer circumference, with a body mounting flange. The outer member inner circumference includes double row outer raceway surfaces. An inner member comprises a wheel hub and an inner ring. The wheel hub is integrally formed, at its outer side end, with a wheel mounting flange. The wheel hub outer circumference has one inner raceway surface opposing one of the double row outer raceway surfaces. A cylindrical portion axially extends from the inner raceway surface. The inner ring is formed, on its outer circumference, with the other inner raceway surface opposing the other of the double row outer raceway surfaces. The inner ring is adapted to be fit onto the cylindrical portion of the wheel hub. Double row rolling elements are rollably contained between the inner and outer raceway surfaces. Cut-out portions are formed between the bolt apertures to avoid the vicinity of each bolt aperture. The deepest portion of each cut-out portion is positioned radially outward of the pitch circle diameter of the bolt apertures. Each cut-out portion is formed as a circular arc configuration. Thus, the cut-out portion deepest portion is positioned closely to a pitch circle diameter of the bolt apertures. Each cut-out portion is smoothly continuous with the outer circumference of the wheel mounting flange. The center of the radius of curvature of each cut-out portion is positioned on an extension of a line passing through the center of the wheel mounting flange and the center of mutually adjacent bolt apertures. A relationship, $R1=0.7-1.5$ PCDb, exists between the radius of curvature R1 of the cut-out portion and the pitch circle diameter PCDb.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 16(*b*) is a cross-sectional view taken along line I-O-I.

FIG. 16(*c*) is a cross-sectional view taken along line II-II.

DETAILED DESCRIPTION

Several preferable embodiments of the present disclosure will be described with reference to accompanying drawings.

Figure 1:
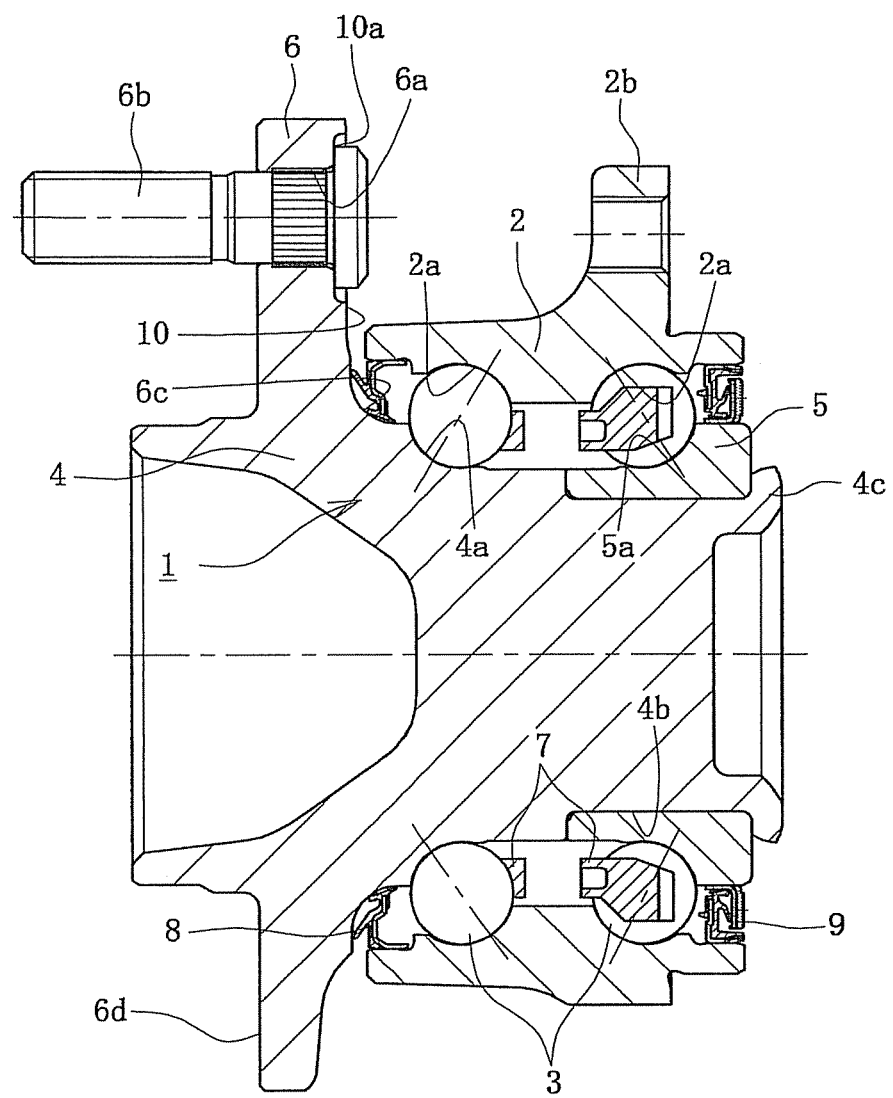
FIG. 1 is a longitudinal section view of a first embodiment of the vehicle wheel bearing apparatus.
Figure 2:
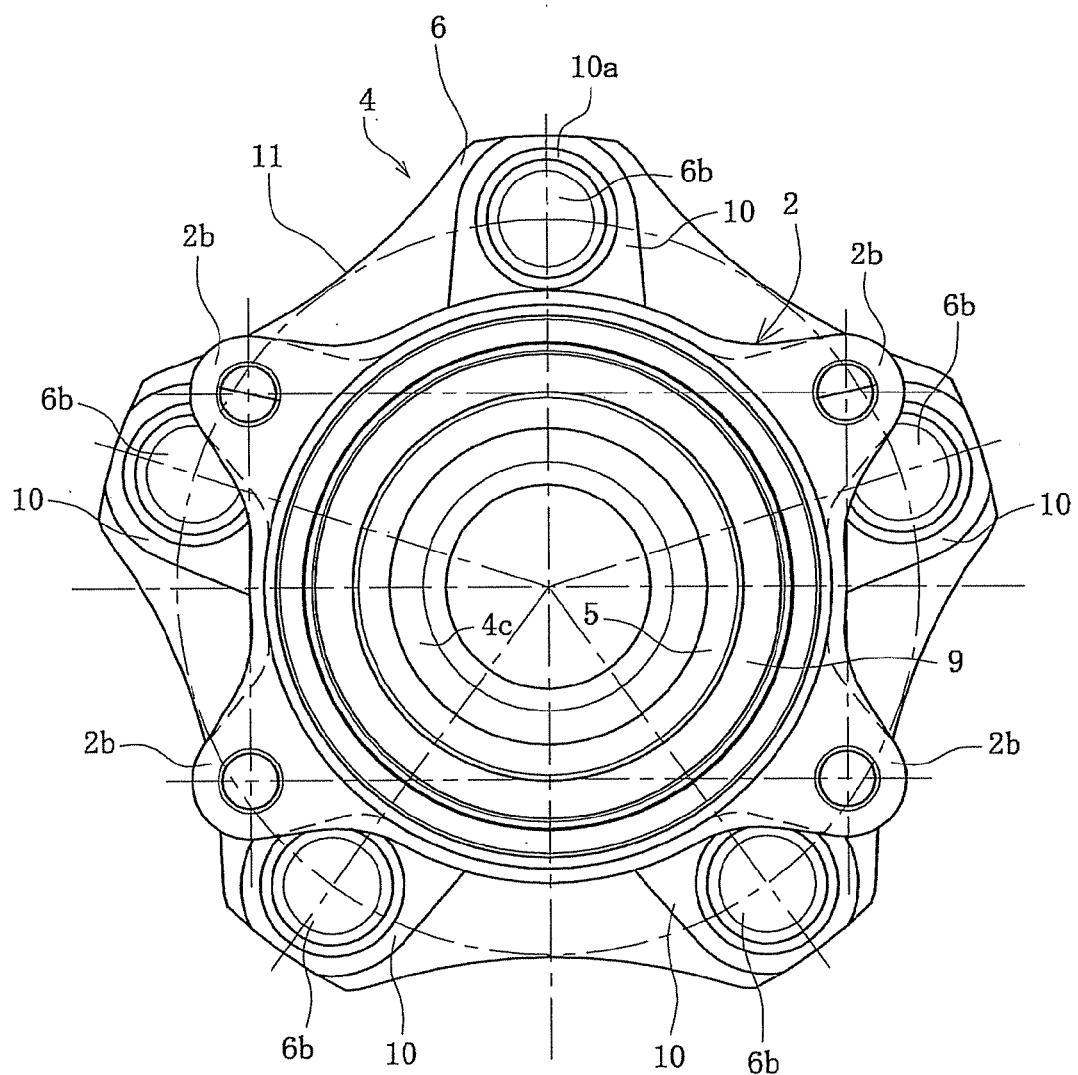
FIG. 2 is a front elevation view of FIG. 1.
Figure 3:
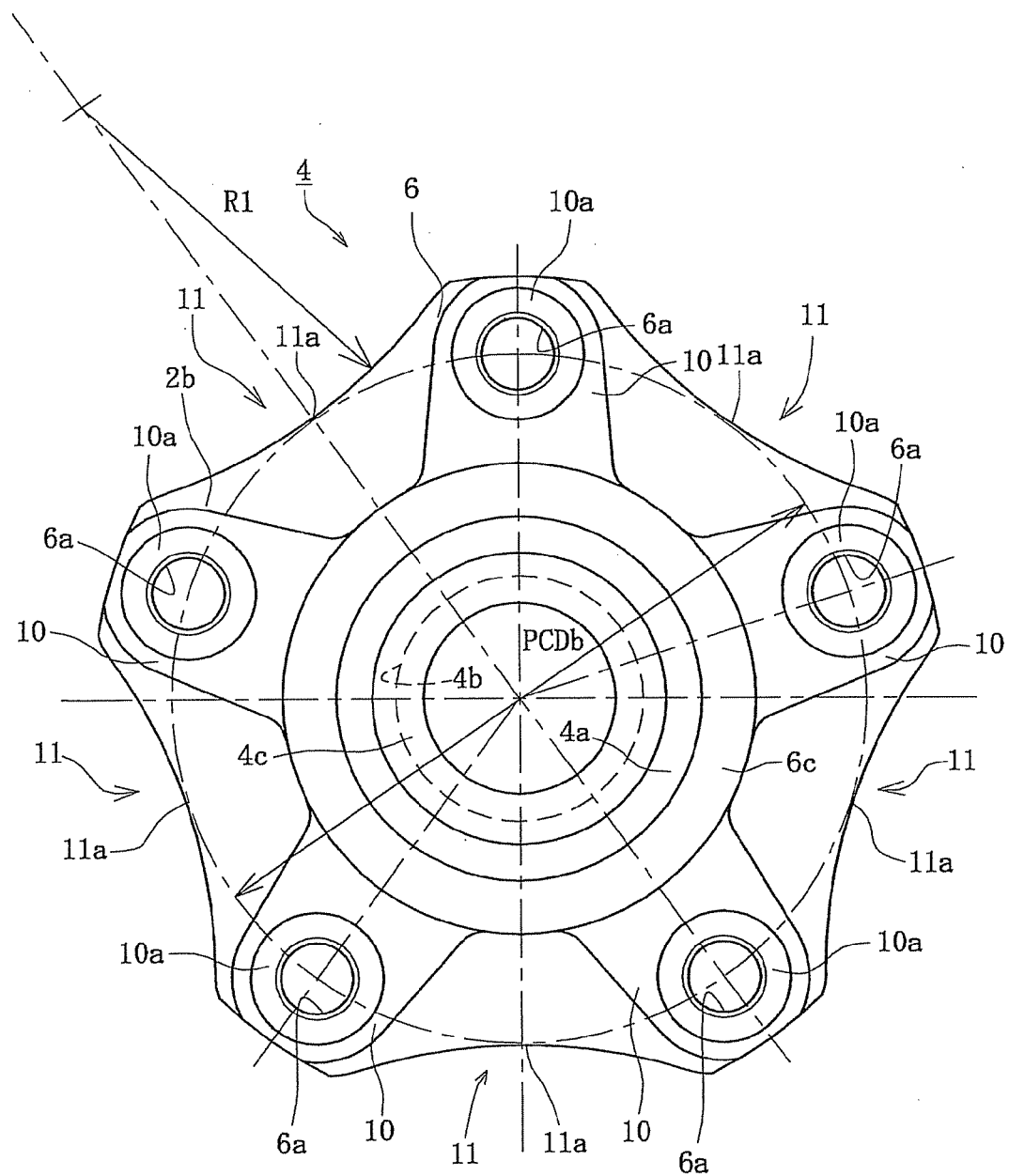
FIG. 3 is a front elevation view of a wheel hub of FIG. 1.
Figure 4:
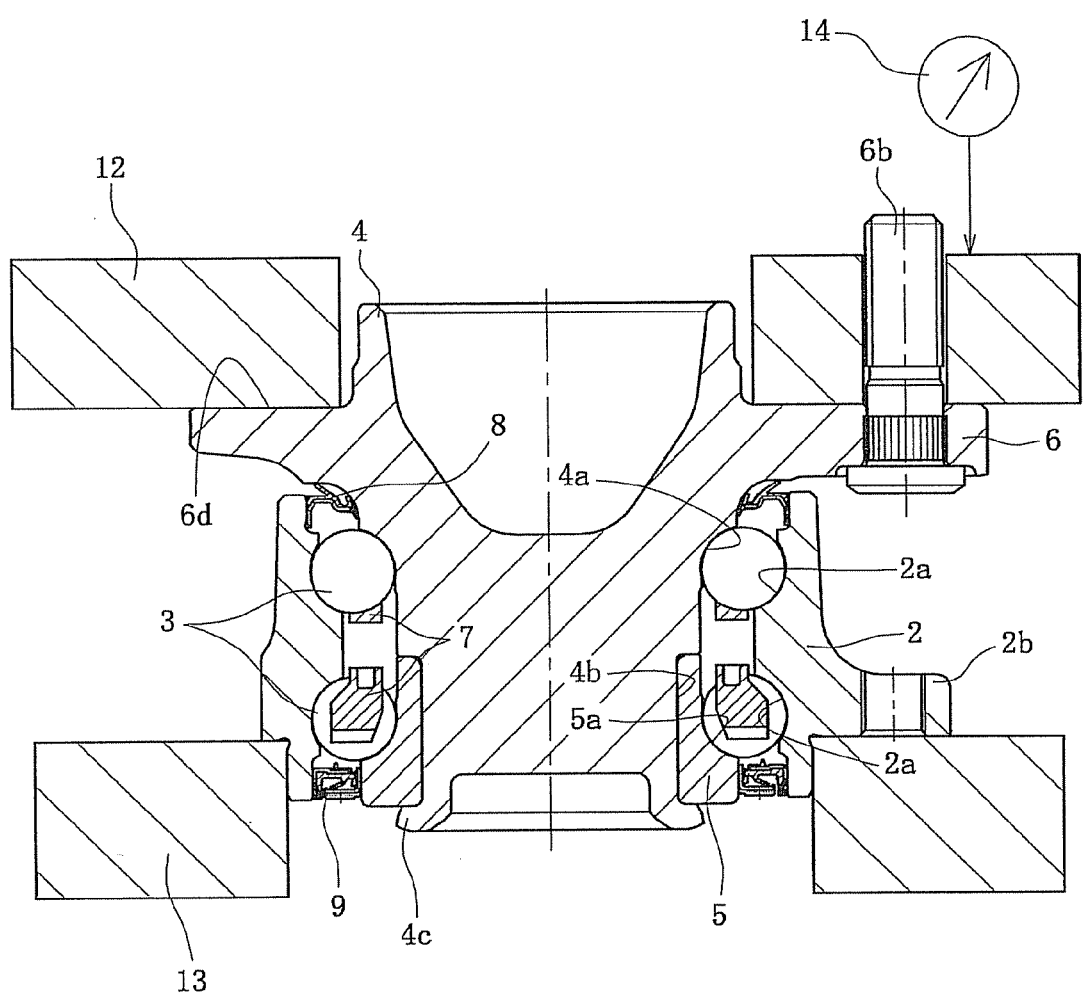
FIG. 4 is an explanatory view of a method for measuring the surface run-out of the wheel mounting flange.

FIG. 1 is a longitudinal cross-section of a first embodiment of a vehicle wheel bearing apparatus of the present disclosure. FIG. 2 is a front elevation view of FIG. 1. FIG. 3 is a front elevation view of a wheel hub of the wheel bearing apparatus of FIG. 1. FIG. 4 is an explanatory view of a method of measuring the surface run-out of the wheel mounting flange. In the description below, the term "outer side" (a left-hand side in drawings) of the wheel bearing apparatus means an outer side of a vehicle body when the wheel bearing apparatus is mounted on the vehicle body. The term "inner side" (a right-hand side in drawings) of the wheel bearing apparatus means an inner side of a vehicle body when the wheel bearing apparatus is mounted on the vehicle body.

The vehicle wheel bearing apparatus of the present disclosure is a third generation type used to rotationally support a driven wheel. It includes an inner member 1, an outer member 2, and double row rolling elements (balls) 3, 3 rollably contained between the inner and outer members 1, 2. The inner member 1 has a wheel hub 4 and an inner ring 5 press-fit onto the wheel hub 4.

As shown in FIGS. 1 and 2, the wheel hub 1 is integrally formed with a wheel mounting flange 6 at its outer side end. The flange 6 mounts a wheel (not shown). One (outer side) inner raceway surface 4a is formed on the wheel hub outer circumference. A cylindrical portion 4b axially extends from the inner raceway surface 4a. The wheel mounting flange 6 is formed with bolt apertures 6a equidistantly along its periphery. Hub bolts 6b, for fastening a wheel, are press fit into the apertures.

The inner ring 5 is press fit onto the cylindrical portion 4b of the wheel hub 4, via a predetermined interference. The other (inner side) inner raceway surface 5a is formed on the outer circumference of the inner ring 5. The inner ring 5 is axially secured on the wheel hub 4 by a caulked portion 4c. The caulked portion 4c is formed by plastically deforming the end of the cylindrical portion 4b radially outward. Thus, the inner ring 5 is secured on the wheel hub 4 under a condition of a so-called "self-retaining structure". This applies a pre-pressure on the bearing. Thus, this reduces the size and weight while assuring the strength and rigidity of the wheel hub 4.

The outer member 2 is integrally formed on its outer circumference with a body mounting flange 2b. The body mounting flange 2b is to be mounted on a knuckle that forms part of a suspension apparatus of a vehicle. The outer member inner circumference includes double row outer raceway surfaces 2a, 2a arranged opposite to the double row inner raceway surfaces 4a, 5a of the inner member 1. The double row rolling elements (balls) 3, 3 are contained between the outer raceway surfaces 2a, 2a and the inner raceway surfaces 4a, 5a. The balls 3, 3 are rollably held by cages 7, 7. Seals 8, 9 are mounted within annular openings formed between the outer member 2 and the inner member 1. The seals 8, 9 prevent leakage of grease contained in the bearing and prohibit the entry of rainwater and dust into the bearing from the outside.

The wheel hub 4 is made of medium/high carbon steel including carbon of 0.40-0.80% by weight such as S53C. The wheel hub 4 is hardened by high frequency induction quenching so that a region, from an inner side base 6c of the wheel mounting flange 6 to the cylindrical portion 4b, is hardened to have a surface hardness of 58-64 HRC. The caulked portion 4c is not quenched and remains as is with its surface hardness of 25 HRC or less after forging. Accordingly, the strength and rigidity of the wheel hub 4 is improved. The fretting wear between the wheel hub 4 and the inner ring 5 can be prevented. Thus, the durability of the wheel hub 4 can be improved. In addition, the workability during plastic deformation of the caulking portion 4c can be improved and the generation of micro cracks in the caulked portion 4c during the caulking process can be prevented.

Similar to the wheel hub 4, the outer member 2 is made of medium/high carbon steel including carbon of 0.40-0.80% by weight such as S53C. The double row outer raceway surfaces 2a, 2a are hardened by high frequency induction quenching to have a surface hardness of 58-64 HRC. The inner ring 5 and balls 3 are made of high carbon chrome steel such as SUJ2. They are hardened to their core by dip quenching to have a surface hardness of 58-64 HRC. Although it is shown here as a double row angular contact ball bearing using balls 3 as the rolling elements, the present disclosure is not limited to such a bearing and may be applied to a double row tapered roller bearing using tapered rollers as the rolling elements.

According to the present disclosure, a plurality of ridge-shaped reinforcing ribs 10 are formed on the inner side surface of the wheel mounting flange 6 of the wheel hub 4, as shown in FIG. 3. Each reinforcing rib 10 radially extends from an annular base 6c of the wheel mounting flange 6. Each rib has a width substantially the same as a portion where each bolt aperture 6a is formed. Each rib includes a pair of opposing sides connected by a web. In addition, a counterbore 10a is formed around each bolt aperture 6a.

Cut-out portions 11, with a curved configuration, are formed between adjacent bolt apertures 6a on the circumference of the wheel mounting flange 6. The cut-out portions 11 avoid the vicinity of each bolt aperture 6a. Each cut-out portion 11 is formed with a circular arc configuration so that its deepest portion 11a is positioned closely to a pitch circle diameter PCDb of the bolt apertures 6a. That is, the deepest portion 11a of each cut-out portion 11 is positioned radially outward of the pitch circle diameter PCDb of the bolt apertures 6a. The cut-out portion 11 smoothly continues to the outer circumference of the wheel mounting flange 6. The center of the radius of curvature of each cut-out portion is positioned on an extension of a line passing through the center of the wheel mounting flange 6, wheel hub 4 and the center of mutually adjacent bolt apertures 6a, 6a. A relationship R1=0.7-1.5 PCDb exists between the radius of curvature R1 of the cut-out portion 11 and the pitch circle diameter PCDb. This makes it possible to provide a vehicle bearing apparatus that can suppress the generation of brake judder by improving the surface run-out accuracy of the wheel mounting flange 6 while suppressing a deformation due to heat treatment. Also, it can reduce the size and weight of the wheel bearing apparatus while keeping strength and rigidity.

If the relationship between the radius of curvature R1 of the cut-out portion 11 and the pitch circle diameter PCDb is R1<0.7 PCDb, plastic flow of the forged material forming the wheel mounting flange is hindered. Thus, the manufacturing accuracy will be reduced due to the generation of shrink marks. On the contrary, if the relationship is R1>1.5 PCDb, the weight reduction effect can not be expected.

Usually such a wheel hub is formed by hot forging. When a prior art wheel hub, having a flower petal configuration and thus no material between bolt apertures, is formed by so-called closed hot forging, where material swaged by a punch and/or a die is closed, it is necessary to force out excessive material between the punches or dies. In the wheel hub 4 of the present disclosure, since the cut-out portions 11 are positioned radially outward of the pitch circle diameter PCDb of the bolt apertures 6a and material is present between the bolt apertures 6a, it is possible to efficiently and accurately perform the forging process without hindering plastic flow of the forged material. Accordingly corners, stepped portions or chamfered portions can be smoothly formed by the closed hot forging. This makes it possible to suppress bur removal to a minimum and thus to reduce the number of manufacturing steps and accordingly the manufacturing cost.

The measurement of the surface run-out of the wheel mounting flange 6 is carried out by using a surface plate (jig) 12 for measurement. Due to the presence of the cut-out portions 11 in a radially outward region of the pitch circle diameter PCDb of the bolt apertures 6a, a continuous measurement cannot be carried out without using the surface plate 12. The measurement is carried out by laying the body mounting flange 2b of the outer member 2 on a base 13. The surface plate 12 is laid on the outer side surface 6d of the wheel mounting flange 6. Finally, a gage 14 contacts the surface plate 12.

Figure 5:
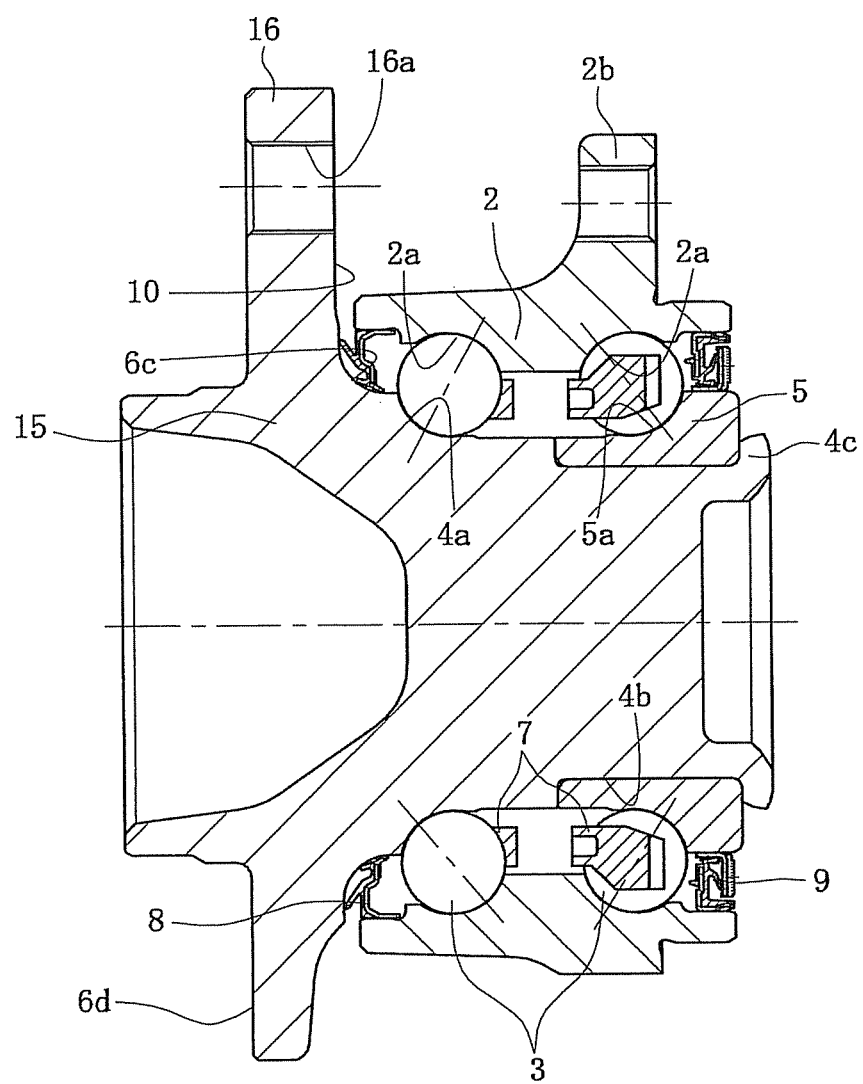
FIG. 5 is a longitudinal section view of a second embodiment of the vehicle wheel bearing apparatus.
Figure 6:
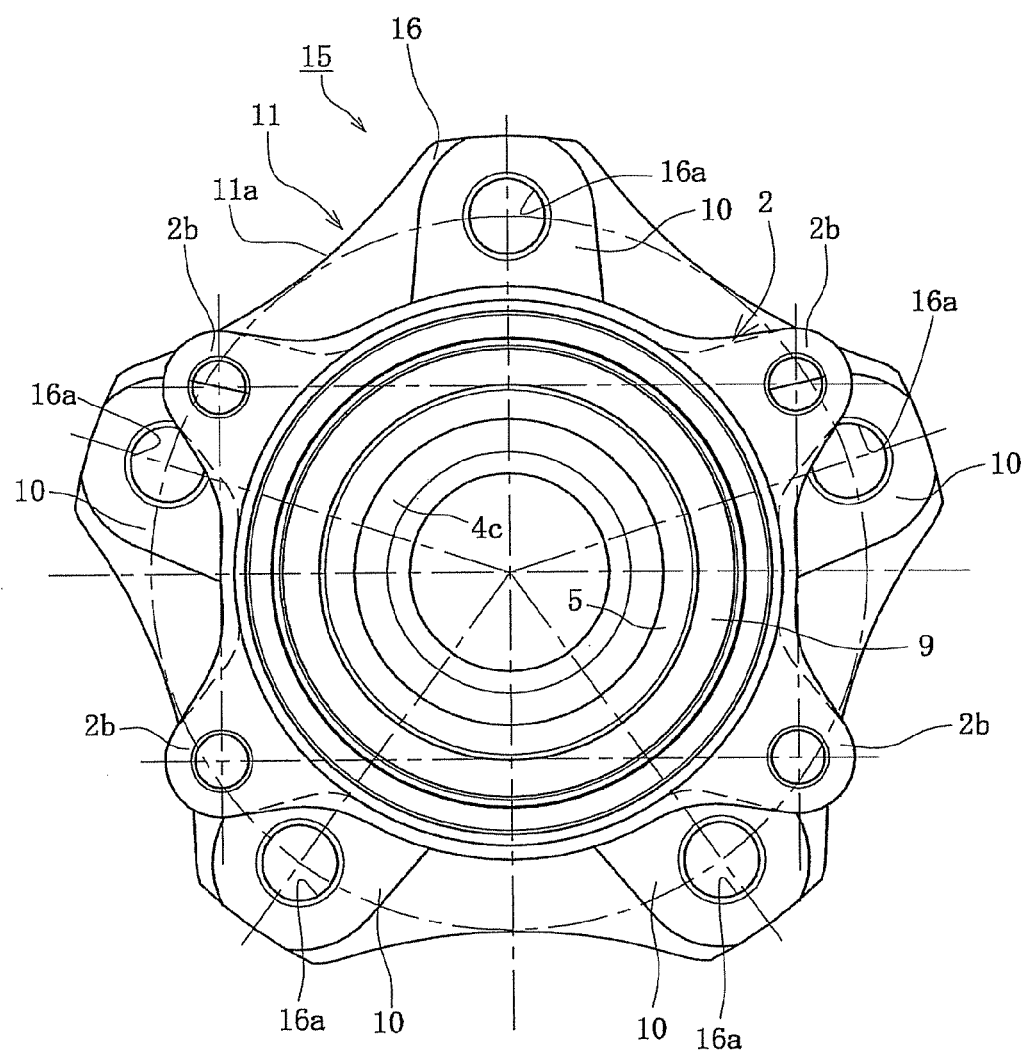
FIG. 6 is a front elevation view of FIG. 5.

FIG. 5 is a longitudinal cross-section of a second embodiment of a vehicle wheel bearing apparatus of the present disclosure. FIG. 6 is a front elevation view of FIG. 5. This embodiment is different from the first embodiment only in the structure of the wheel hub. Thus, the same reference numerals are used in this embodiment to identify the same components. Similar components have the same functions as those of the first embodiment.

The wheel hub 15 is integrally formed with a wheel mounting flange 16 at its outer side end. Bolt apertures 16a are each formed with an internal thread. The apertures are equidistantly formed in the wheel mounting flange 16 along its periphery. A wheel and a brake rotor (not shown) are secured on the wheel mounting flange 16 in an overlapped condition by hub bolts threaded into the bolt apertures 16a. A plurality of ridge-shaped reinforcing ribs 10 are formed on the inner side surface of the wheel mounting flange 16 of the wheel hub 15, as shown in FIG. 6. Each reinforcing rib 10 radially extends and has a width substantially the same as a portion where each bolt aperture 16a is formed.

Cut-out portions 11, with circular arc configurations, are formed between adjacent bolt apertures 16a on the circumference of the wheel mounting flange 16. The cut-out portions 11 avoid the vicinity of each bolt aperture 16a. Each cut-out portion 11 is formed so that its deepest portion 11a is positioned closely to a pitch circle diameter PCDb of the bolt apertures 16a. Similar to the first embodiment, this makes it possible to provide a vehicle bearing apparatus that can suppress the generation of brake judder by improving the surface run-out accuracy of the wheel mounting flange 16 while suppressing a deformation due to heat treatment. Also, it can reduce the size and weight of the wheel bearing apparatus while keeping strength and rigidity.

Figure 7:
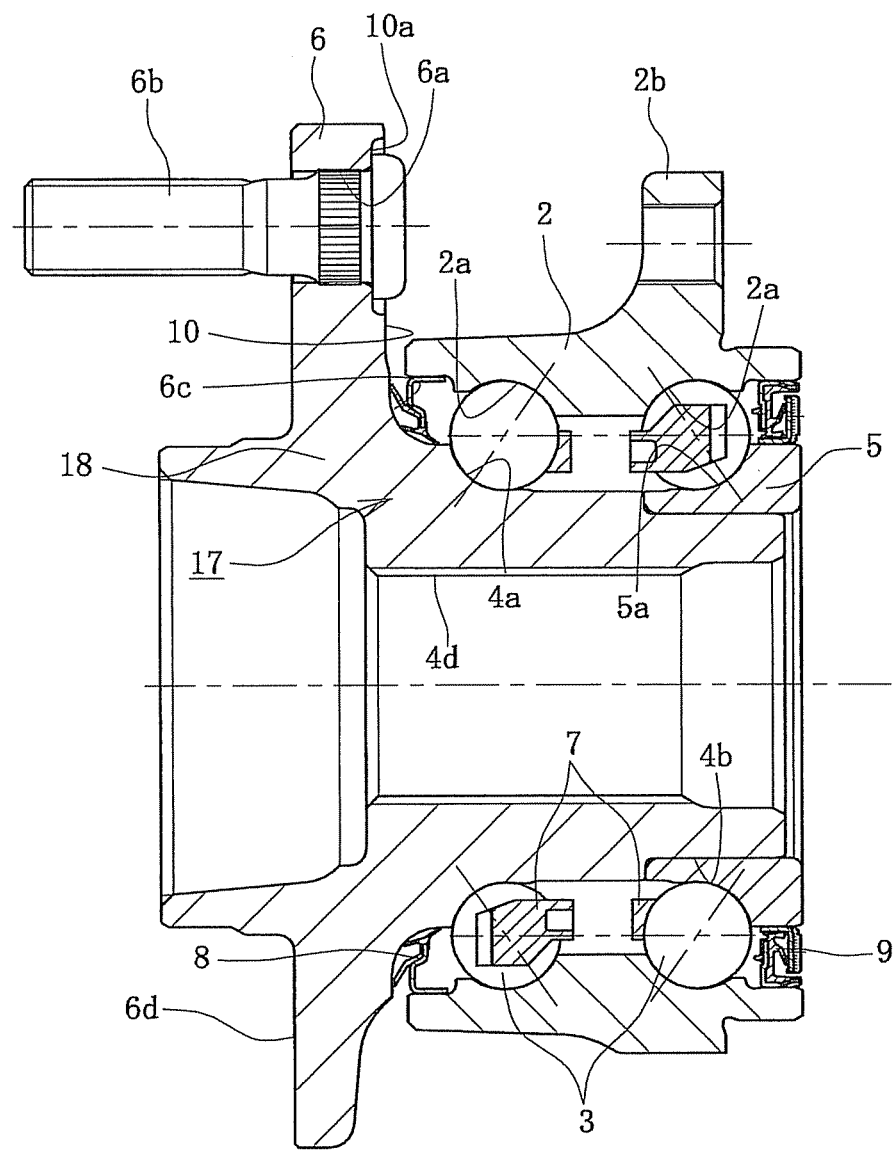
FIG. 7 is a longitudinal section view of a third embodiment of the vehicle wheel bearing apparatus.
Figure 8:
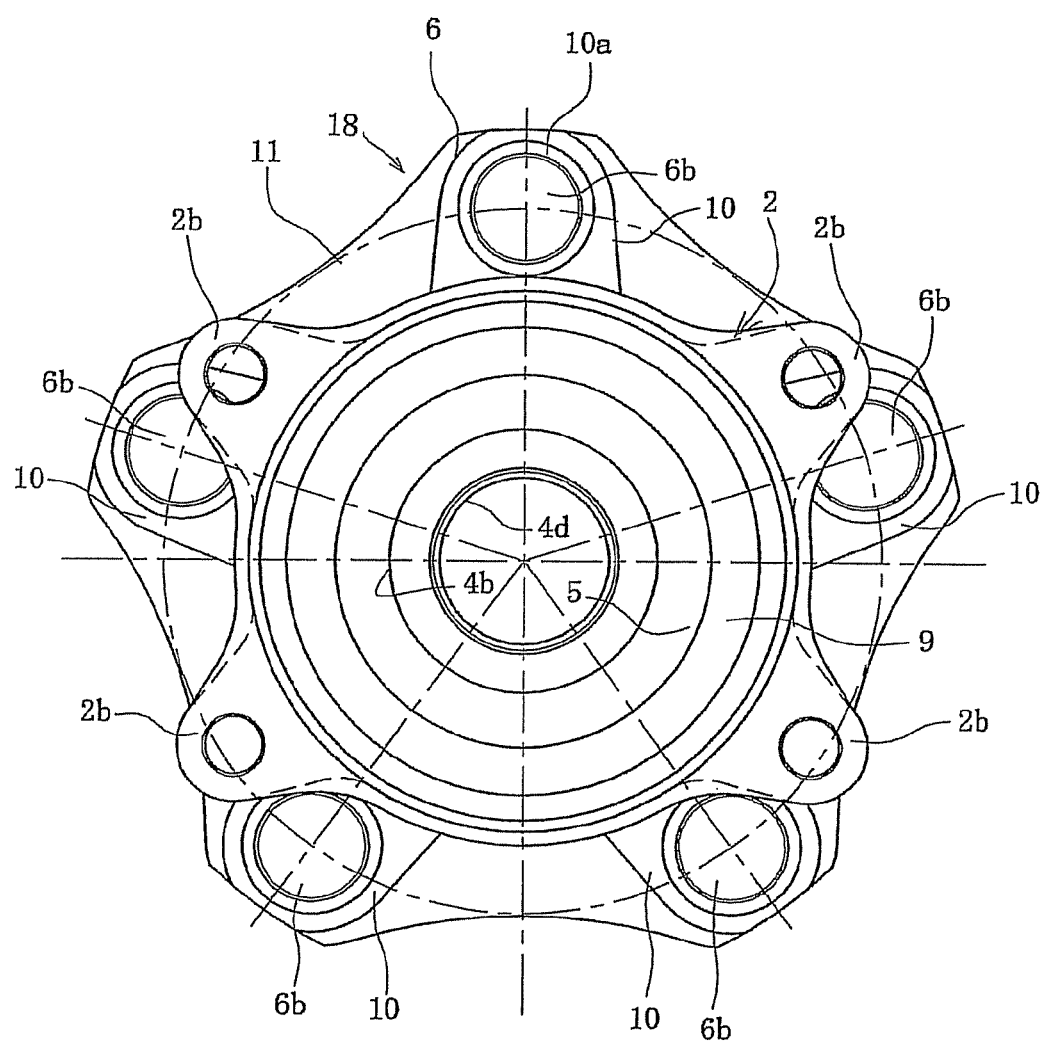
FIG. 8 is a front elevation view of FIG. 7.

FIG. 7 is a longitudinal cross-section of a third embodiment of a vehicle wheel bearing apparatus of the present disclosure. FIG. 8 is a front elevation view of FIG. 7. This embodiment is different from the first embodiment only in the structure of the wheel hub. Thus, the same reference numerals are also used in this embodiment to identify the same components. Similar components have the same functions as those of the previous embodiments.

The vehicle wheel bearing apparatus of this embodiment is a third generation type used to rotationally support a driving wheel. It includes an inner member 17, an outer member 2, and double row rolling elements 3, 3 rollably contained between the inner and outer members 17, 2. The inner member 17 includes a wheel hub 18 and an inner ring 5 press-fit onto the wheel hub 18.

As shown in FIGS. 7 and 8, the wheel hub 18 is integrally formed with a wheel mounting flange 6 at its outer side end. One inner raceway surface 4a is formed on the wheel hub outer circumference. A cylindrical portion 4b extends from the inner raceway surface 4a. A serration (or spline) 4d is provided on the inner circumference of the wheel hub for torque transmission. The wheel mounting flange 6 is formed with bolt apertures 6a equidistantly along its periphery where hub bolts 6b, for fastening a wheel, are press fit.

Similar to the previous embodiments, cut-out portions 11, with circular arc configurations, are formed between adjacent bolt apertures 6a on the circumference of the wheel mounting flange 6. The cut-out portions 11 avoid the vicinity of each bolt aperture 6a. Each cut-out portion 11 is formed so that its deepest portion 11a is positioned closely to a pitch circle diameter PCDb of the bolt apertures 6a. Similar to the previous embodiments, this makes it possible to provide a vehicle bearing apparatus that can suppress the generation of brake judder by improving the surface run-out accuracy of the wheel mounting flange 6 while suppressing a deformation due to heat treatment. Also, it can reduce the size and weight of the wheel bearing apparatus while keeping strength and rigidity.

Figure 9:
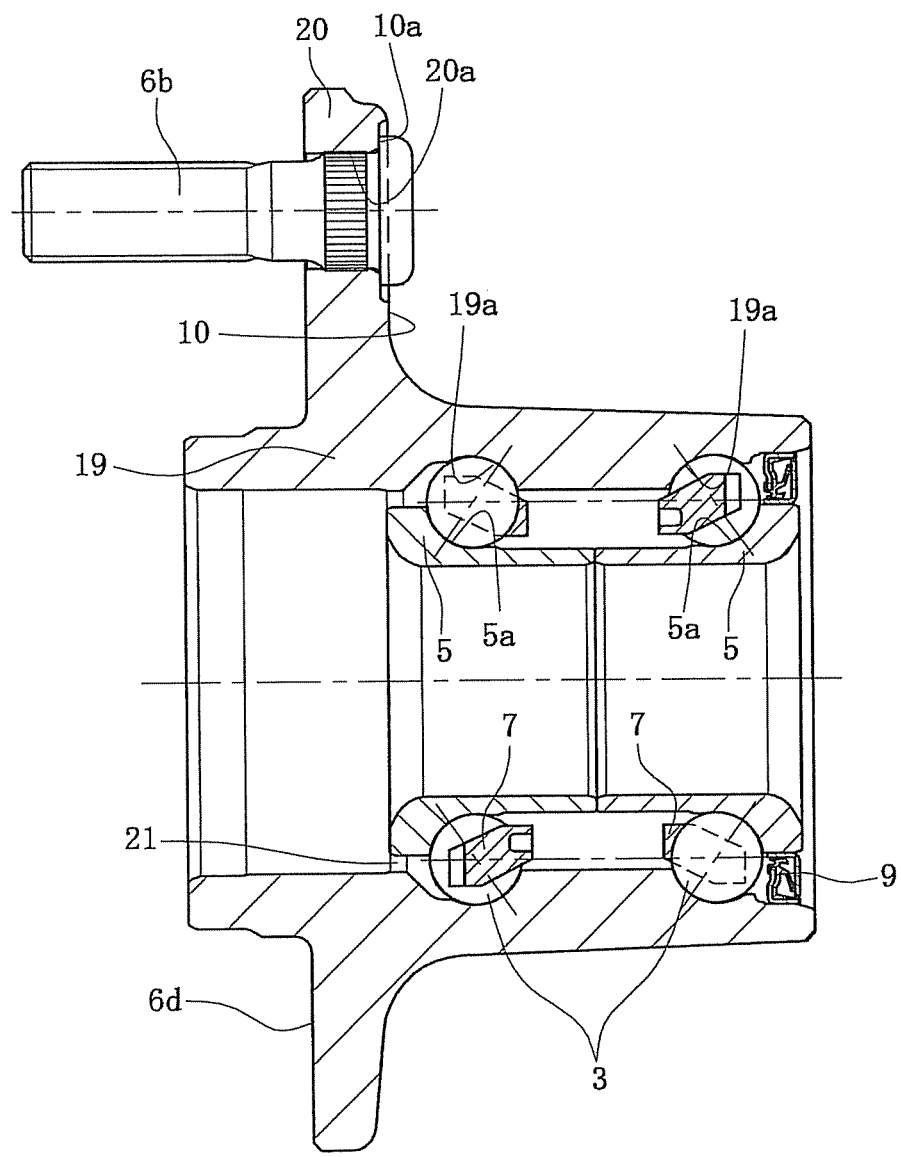
FIG. 9 is a longitudinal section view of a fourth embodiment of the vehicle wheel bearing apparatus.
Figure 10:
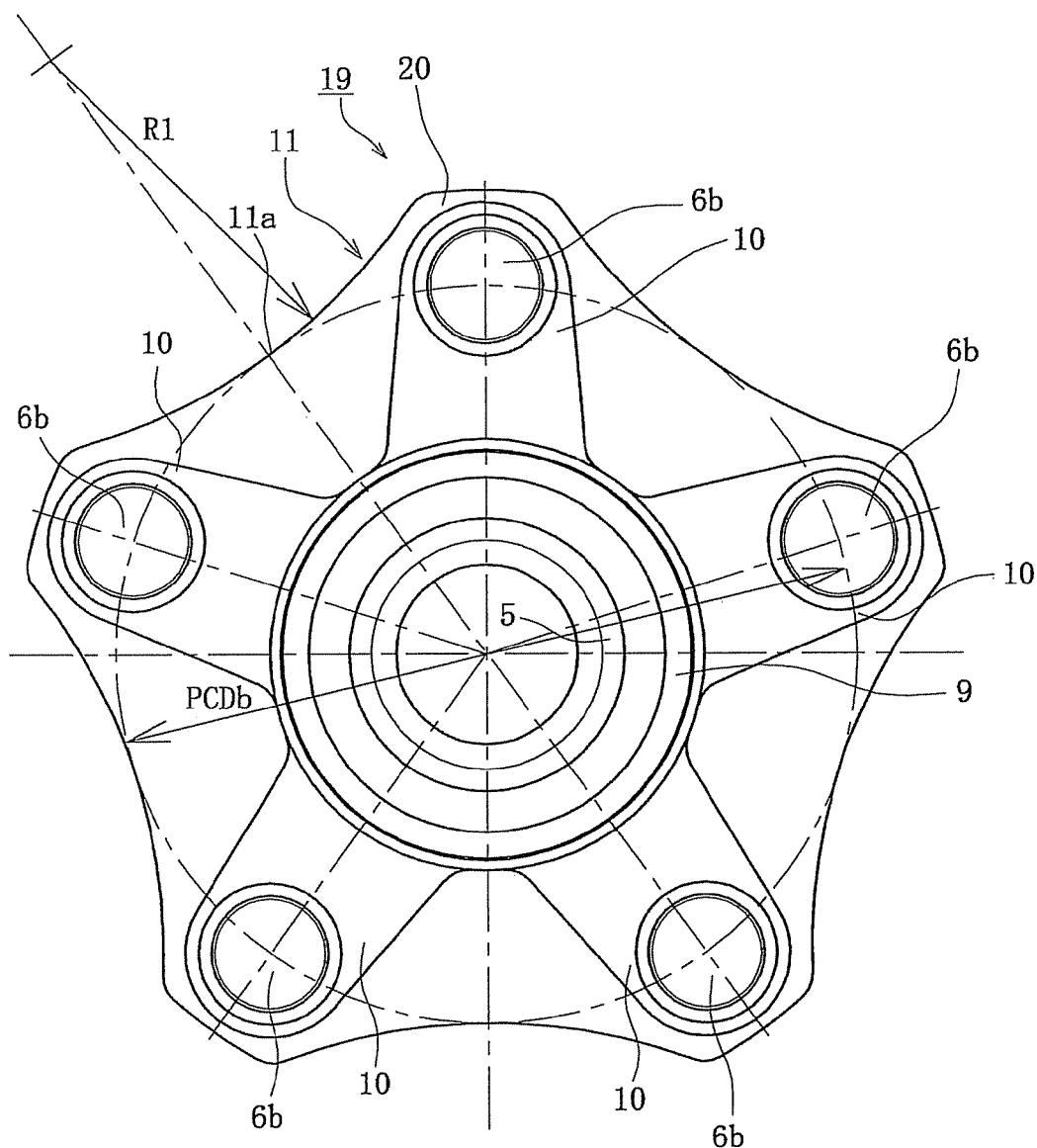
FIG. 10 is a front elevation view of FIG. 9.

FIG. 9 is a longitudinal cross-section of a fourth embodiment of a vehicle wheel bearing apparatus of the present disclosure. FIG. 10 is a front elevation view of FIG. 9. The same reference numerals are used in this embodiment for the same components. Similar components have the same functions as those of the previous embodiments.

The vehicle wheel bearing apparatus of this embodiment is a second generation type used to rotationally support a driven wheel. It includes an outer member 19, a pair of inner rings 5, 5, and double row rolling elements 3, 3 rollably contained between the outer member 19 and inner rings 5, 5.

As shown in FIGS. 9 and 10, the outer member 19 is integrally formed with a wheel mounting flange 20 at its outer side end. Double row outer raceway surfaces 19a, 19a are formed on the outer member inner circumference. The wheel mounting flange 20 is formed with bolt apertures 20a equidistantly along its periphery. Hub bolts 6b, for fastening a wheel, are press fit into the bolt apertures 20a.

The double row rolling elements 3, 3 are rollably contained, via cages 7, 7, between the double row outer raceway surfaces 19a, 19a of the outer member 19 and inner raceway surfaces 5a, 5a of the pair of inner ring 5, 5. In addition, a labyrinth seal 21 is formed between the outer member 19 and the outer side inner ring 5. The seal 21 is mounted within an annular opening formed between an inner side end of the outer member 19 and the inner ring 5 to prevent leakage of grease contained in the bearing and the entry of rainwater and dust into the bearing from the outside.

Similar to the previous embodiments, cut-out portions 11, with circular arc configurations, are formed between adjacent bolt apertures 20a on the circumference of the wheel mounting flange 20. The cut-out portions avoid the vicinity of each hub bolt 6b (bolt aperture 20a). Each cut-out portion 11 is formed so that its deepest portion 11a is positioned closely to a pitch circle diameter PCDb of the hub bolts 6b. This makes it possible to provide a vehicle bearing apparatus that can suppress the generation of brake judder by improving the surface run-out accuracy of the wheel mounting flange 20 while suppressing a deformation due to heat treatment. Also, it can reduce the size and weight of the wheel bearing apparatus while keeping strength and rigidity.

Figure 11:
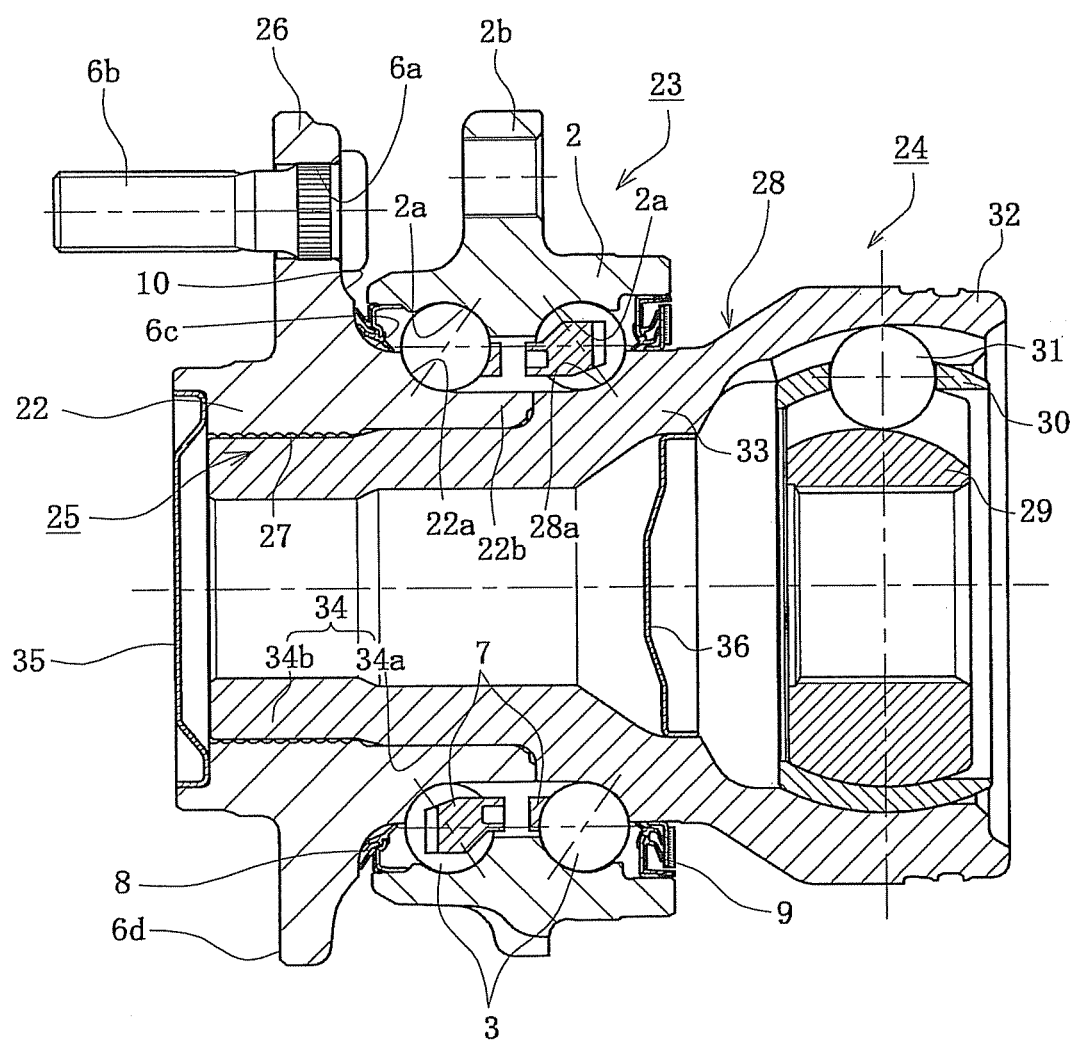
FIG. 11 is a longitudinal section view of a fifth embodiment of the vehicle wheel bearing apparatus.
Figure 12:
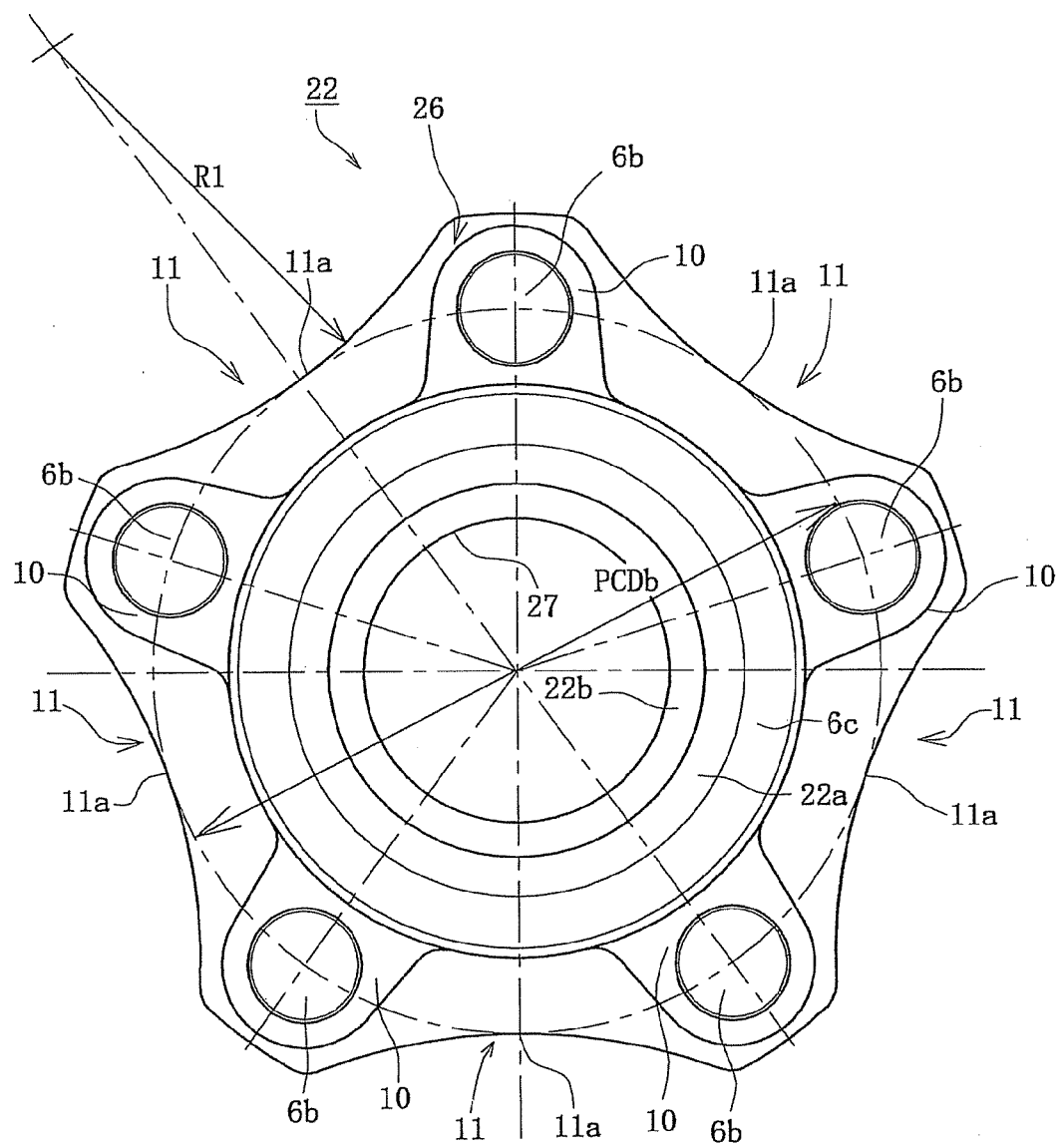
FIG. 12 is a front elevation view of FIG. 11.
Figure 13:
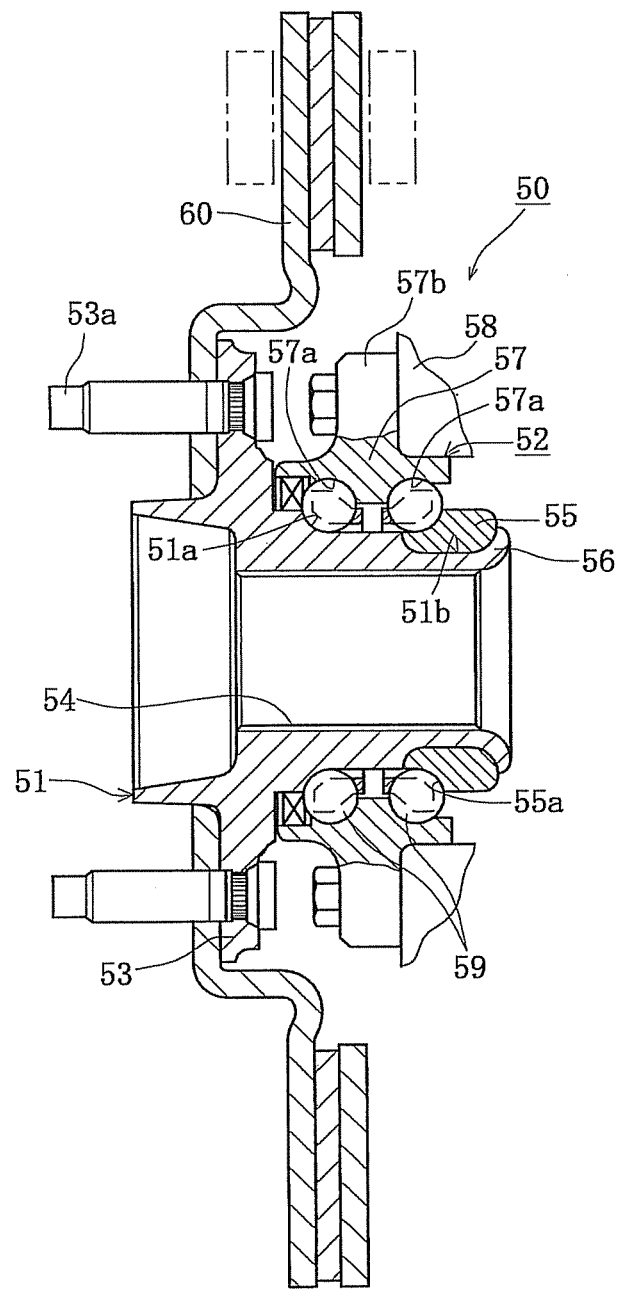
FIG. 13 is a longitudinal section view of a prior art vehicle wheel bearing apparatus.
Figure 14:
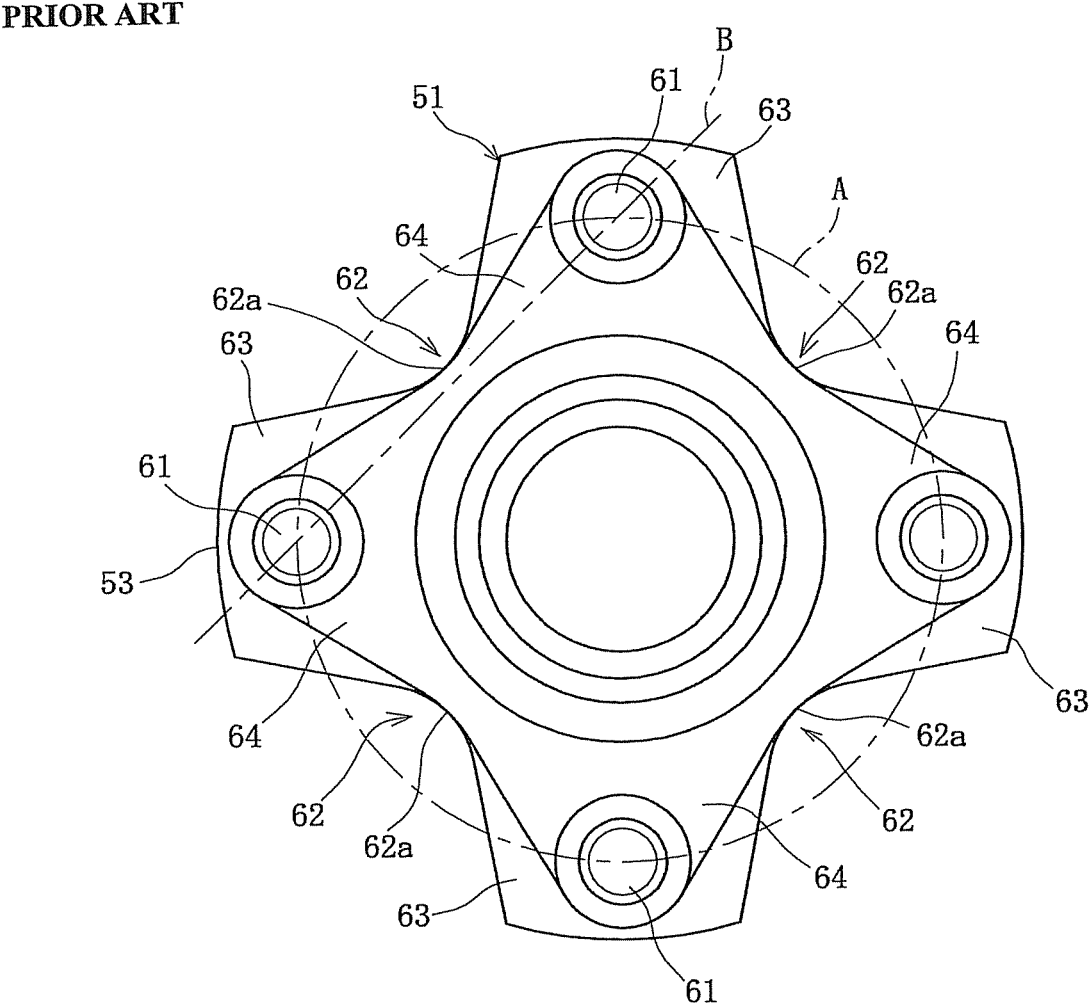
FIG. 14 is a front elevation view of a prior art wheel hub.
Figure 15:
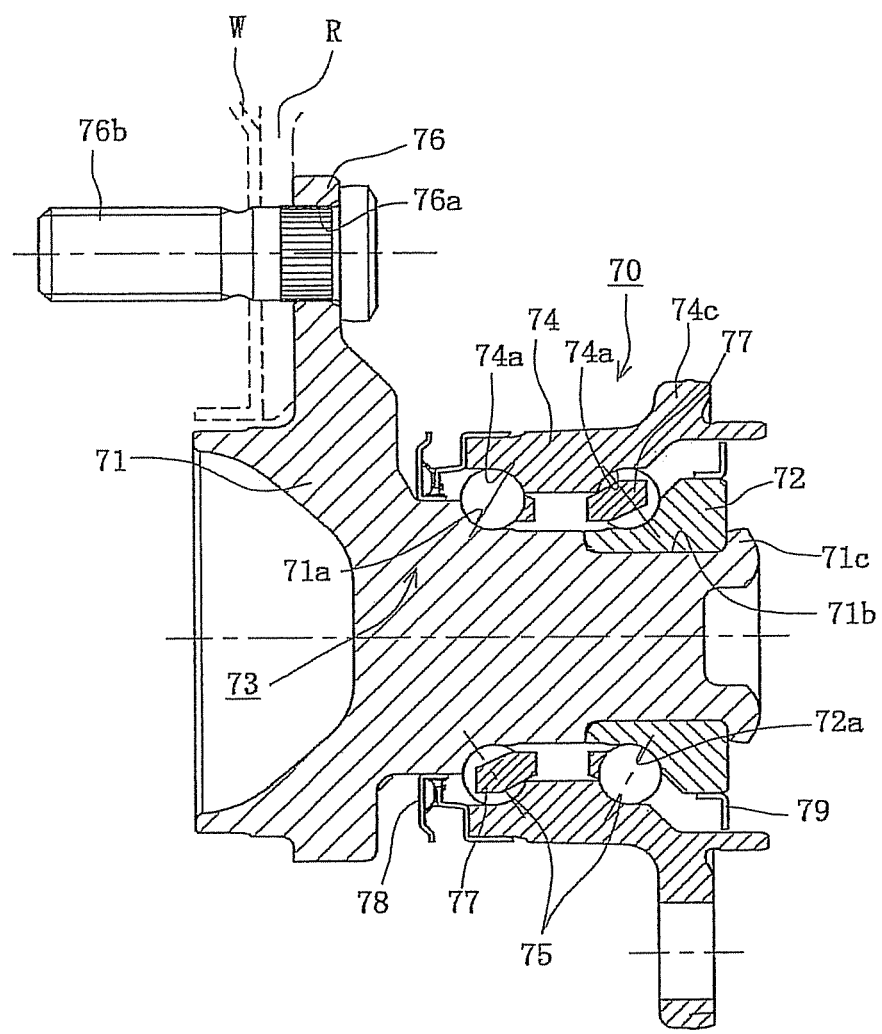
FIG. 15 is a longitudinal section view of another prior art vehicle wheel bearing apparatus.
Figure 16:
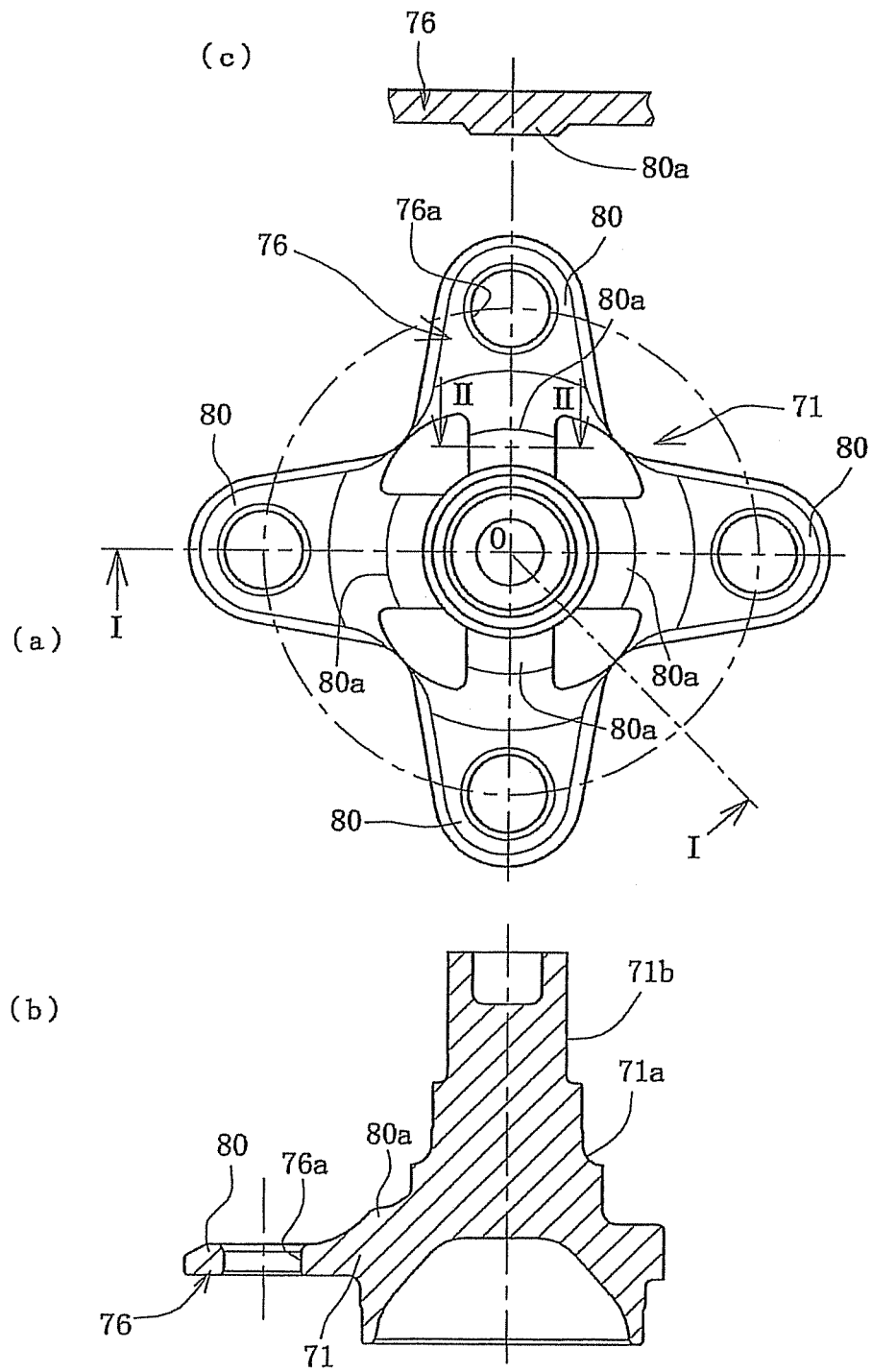
FIG. 16(*a*) is a front elevation view of a wheel hub of FIG. 15

FIG. 11 is a longitudinal cross-section of a fifth embodiment of a vehicle wheel bearing apparatus of the present disclosure. FIG. 12 is a front elevation view of the wheel hub of FIG. 11. The same reference numerals are used in this embodiment for the same components previously identified. Similar components have the same functions as those of the previous embodiments.

This wheel bearing apparatus is formed as a unit of a wheel hub 22, a double row rolling bearing 23 and a constant velocity universal joint 24. It has a fourth generation type structure. The double row rolling bearing 23 includes an outer member 2, an inner member 25 and double row rolling elements 3, 3 contained between the outer and inner members 2, 25.

The inner member 25 includes the wheel hub 22. An outer joint member 28 is inserted into the wheel hub 22, as described below. The wheel hub 22 is formed, on its outer side end, with a wheel mounting flange 26. The wheel hub outer circumference has one (outer side) inner raceway surface 22a that opposes one of the double row outer raceway surfaces 2a, 2a. A cylindrical portion 22b axially extends from the inner raceway surface 22a. The wheel mounting flange 26 is formed with a plurality of bolt apertures 6a equidistantly positioned along its circumference. Hub bolts 6b are press fit into the bolt apertures 6a.

The wheel hub 22 is made of medium/high carbon steel such as S53C including carbon of 0.40-0.80% by weight. The wheel hub 22 is formed with a hardened layer having surface hardness of 58-64 HRC. The wheel hub 22 is hardened by high frequency induction hardening in a region from an inner side base portion 6c of the wheel mounting flange 26 forming a seal land portion of an outer side seal 8 to the cylindrical portion 22b. This improves the anti-fatigue characteristics of the inner raceway surface 22a and the strength and rigidity of the cylindrical portion 22b and thus the durability of the wheel hub 22.

The inner circumference of the wheel hub 22 is formed with an irregular portion 27 that is hardened by the high frequency induction heating. The irregular portion 27 is formed with a crisscross pattern knurl. It is formed by combining a plurality of independent annular grooves, formed by a lathe, and a plurality of axial grooves, formed by broaching as orthogonally crossed grooves or mutually inclined helical grooves. Each projection forming the irregular portion 27 may be a pyramid-like point to increase the biting ability of the irregular portion 27.

The constant velocity universal joint 24 includes the outer joint member 28, a joint inner ring 29, a cage 30 and torque transmitting balls 31. The outer joint member 28 has a cup shaped mouth portion 32, a shoulder portion 33, and a cylindrical stem portion 34. The shoulder portion 33 forms the bottom of the mouth portion 32. The cylindrical stem portion 34 axially extends from the shoulder portion 33 and is integrally formed with it. The circumference of the shoulder portion 33 is formed with the other (inner side) inner raceway surface 28a that is positioned opposite to the other one of the outer raceway surface 2a of the outer member 2. The stem portion 34 is formed with a cylindrical spigot portion 34a fit into the cylindrical portion 22b of the wheel hub 22 via a predetermined radial gap. A fitting portion 34b is at the end of the spigot portion 34a.

The outer joint member 28 is made of medium/high carbon steel such as S53C including carbon of 0.40-0.80% by weight. The outer joint member 28 is formed with a hardened layer having a surface hardness 58-64 HRC. The outer joint member 28 is hardened by high frequency induction hardening in a region from the outer circumference of the shoulder portion 33 to the inner raceway surface 28a and the outer circumference of the cylindrical spigot portion 34a of the stem portion 34. The fitting portion 34b remains as raw material without being hardened after being forged.

Double row rolling elements 3, 3 are contained between the double row outer raceway surfaces 2a, 2a of the outer member 2 and corresponding double row inner raceway surfaces 22a, 28a of the inner member 25. The rolling elements 3, 3 are freely rollably held by cages 7, 7.

The stem portion 34 of the outer joint member 28 is press fit into the wheel hub 22 until the shoulder portion 33 of the outer joint member 28 abuts the end face of the cylindrical portion 22b of the wheel hub 22. A radially expanding tool, such as a mandrel, is inserted into the bore of the fitting portion 34b of the stem portion 34. The wheel hub 22 and the outer joint member 28 are integrally connected to each other by expanding and plastically deforming the material of the fitting portion 34b to bite into the hardened material of the irregular portion 27 of the wheel hub 22. This prevents a loose connection between the wheel hub 22 and the outer joint member 28. Also, it maintains a pre-load for a long term. Reference numerals 35, 36 denote end caps fit, respectively, on the outer side ends of the wheel hub 22 and on the shoulder portion 33 of the outer joint member 28. The end caps prevent leakage of lubricating grease contained within the joint and ingress of rain water or muddy water into the joint.

According to the present disclosure, a plurality of ridge-shaped reinforcing ribs 10 are formed on the inner side surface of the wheel mounting flange 26 of the wheel hub 22 as shown in FIG. 12. Each reinforcing rib 10 radially extends from the annular base portion 6c of the wheel mounting flange 26 and has a substantially same width as a portion in which each bolt aperture 6a is formed.

Cut-out portions 11, with circular arc configuration, are formed between adjacent bolt 6b (bolt apertures 6a) on the circumference of the wheel mounting flange 26. The cut-out portions avoid the vicinity of each bolt 6b. Each cut-out portion 11 is formed so that its deepest portion 11a is positioned closely to a pitch circle diameter PCDb of the bolt apertures 6a. Similar to the previous embodiments, this makes it possible to provide a vehicle bearing apparatus that can suppress the generation of brake judder by improving the surface run-out accuracy of the wheel mounting flange 26 while suppressing a deformation due to heat treatment and also reduce the size and weight of the wheel bearing apparatus while keeping strength and rigidity.

The vehicle wheel bearing apparatus of the present disclosure can be applied to any type of wheel bearing apparatus including a wheel hub or an outer member integrally formed with a wheel mounting flange whether it is used for a driving wheel or a driven wheel.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
   an outer member formed with double row outer raceway surfaces on an inner circumference;
   an inner member formed with double row inner raceway surfaces on an outer circumference, the double row inner raceway surfaces are arranged opposite to the double row outer raceway surfaces;
   double row rolling elements are freely rollably contained between the outer raceway surfaces and the inner raceway surfaces, respectively, of the outer member and the inner member;
   either one of the outer member or inner member is integrally formed, on an outer side end, with a wheel mounting flange to mount a wheel, a plurality of bolt apertures is equidistantly formed in the wheel mounting flange along a circumference, and the wheel is adapted to be secured on the wheel mounting flange by a plurality of bolts secured in the bolt apertures, the wheel mounting flange includes a plurality of reinforcement ribs, each reinforcement rib includes a pair of opposing sides and a web connecting the opposing sides; and
   cut-out portions are formed between the bolt apertures, the cut-out portions avoid the vicinity of each bolt aperture, and that each cut-out portion is formed as a circular arc configuration so that a deepest portion is positioned closely to a pitch circle diameter of the bolt apertures, the deepest portion of each cut-out portion is positioned radially outward of the pitch circle diameter of the bolt apertures, each cut-out portion is continuous with the outer circumference of the wheel mounting flange, a center of a radius of curvature of each cut-out portion is positioned on an extension of a line passing through a center of the wheel mounting flange and a center of mutually adjacent bolt apertures, a relationship of R1=0.7-1.5 PCDb exists between the radius of curvature R1 of each cut-out portion and the pitch circle diameter PCDb, the circular arc configuration extends to the wheel mounting flange outer circumference such that the cut-out portions intersect the wheel mounting flange outer circumference at a position, the position is adjacent the web between the opposing sides connected by the web of the same reinforcement ribs on the wheel mounting flange.

2. The vehicle wheel bearing apparatus claim 1, wherein the plurality of reinforcing ribs are formed on the inner side surface of the wheel mounting flange, and each reinforcing rib radially extends from an annular base of the wheel mounting flange and has a width substantially the same as a portion where each bolt aperture is formed.

3. The vehicle wheel bearing apparatus of claim 1, wherein the wheel mounting flange is formed by closed hot forging.

4. The vehicle wheel bearing apparatus of claim 1, wherein the inner member further comprises a wheel hub including the wheel mounting flange, an axially extending cylindrical portion, and at least one inner ring press fit onto the cylindrical portion of the wheel hub.

5. The vehicle wheel bearing apparatus of claim 1, wherein the outer member has the wheel mounting flange and the inner member further comprises a pair of inner rings.

6. The vehicle wheel bearing apparatus of claim 1, wherein the inner member further comprises a wheel hub having the wheel mounting flange integrally formed at one end, one of the double row inner raceway surfaces, formed on the wheel hub, is arranged opposite to one of the double row outer raceway surfaces, a cylindrical portion axially extends from the inner raceway surface, and a hardened irregular portion is formed on an inner circumference of the wheel hub, an outer joint member of a constant velocity universal joint is fit into the cylindrical portion of the wheel hub and an outer joint member outer circumference including the remaining inner raceway surface that is arranged opposite to the double row outer raceway surfaces row outer raceway surfaces, a hollow stem portion axially extending from the inner raceway surface of the outer joint member, and the wheel hub and the outer joint member are integrally connected to each other by radially expanding a fitting portion of the stem portion of the outer joint member and by forcing the fitting portion to bite into the hardened irregular portion formed on the inner circumference of the wheel hub.

* * * * *

UNITED STATES PATENT AND TRADEMARK OFFICE
CERTIFICATE OF CORRECTION

PATENT NO. : 8,568,036 B2
APPLICATION NO. : 12/774029
DATED : October 29, 2013
INVENTOR(S) : Akira Torii It is certified that error appears in the above-identified patent and that said Letters Patent is hereby corrected as shown below:

In the Specification

Column 5
Line 17        "portion," should be --portion--

Column 12
Line 18        "11. a" should be --11a--

In the Claims

Column 14
Line 19, claim 6 after "surfaces", delete "row outer raceway surfaces"

Signed and Sealed this
Fourth Day of March, 2014

Michelle K. Lee
*Deputy Director of the United States Patent and Trademark Office*